United States Patent [19]

Pennie et al.

[11] 4,375,520

[45] Mar. 1, 1983

[54] DENSIFICATION OF PARTICULATE MATERIALS

[75] Inventors: Thomas W. Pennie, Neshanic; Sunil S. Parikh, Bound Brook; Charles Lowe, Martinsville, all of N.J.

[73] Assignee: Dart Industries Inc., Northbrook, Ill.

[21] Appl. No.: 252,764

[22] Filed: Apr. 10, 1981

[51] Int. Cl.³ .............................. C08J 3/20; C08J 9/16; C08K 5/04; C08L 23/00

[52] U.S. Cl. ............................... 521/57; 106/308 Q; 106/308 F; 106/308 M; 252/383; 252/384; 521/59; 524/109; 524/294; 524/399; 524/400; 524/425; 524/427; 524/563; 524/582; 524/583; 524/584; 524/585; 524/586; 524/592

[58] Field of Search .......... 106/308 Q, 308 F, 308 M; 260/18 EP, 18 PF, 23 H; 252/383, 384; 521/57, 59; 524/109, 399, 400, 585, 586, 563, 592, 582, 583, 584

[56] References Cited

U.S. PATENT DOCUMENTS

| | | | |
|---|---|---|---|
| 3,061,572 | 10/1962 | Packer | 260/31.4 R |
| 3,090,763 | 5/1963 | Hillier | 260/23 X |
| 3,196,117 | 7/1965 | Boller | 260/22 T |
| 3,433,753 | 3/1969 | Farkas et al. | 260/22 A |
| 3,471,433 | 10/1969 | Bradley et al. | 106/308 Q |
| 3,471,439 | 10/1969 | Bixler et al. | 106/308 Q |
| 3,993,584 | 11/1976 | Owen et al. | 106/308 M |
| 4,230,501 | 10/1980 | Howard et al. | 106/308 Q |
| 4,255,375 | 3/1981 | MacPherson et al. | 106/308 F |
| 4,285,994 | 8/1981 | Pearce et al. | 106/308 Q |

*Primary Examiner*—Ronald W. Griffin
*Attorney, Agent, or Firm*—Bryant W. Brennan; Leigh B. Taylor

[57] ABSTRACT

A procedure is provided for the production of clean, dustless particulate granules from dusty, dirty particles by treatment with a composition comprising a liquid polymeric substance, illustratively, epoxidized soybean oil, and a solid, low molecular weight polymer having a melting point in the range of about 95° to 105° C., illustratively, a polyethylene vinyl acetate copolymer in the proportions of from 1 part of solid polymer to 1 part of liquid polymeric substance to 2 parts of solid polymer to 1 part of liquid polymeric substance. In one modification of the procedure, the ingredients were charged to a Papenmeir mixer and the mixer was run at 1500 RPM until a temperature of 95° C. was reached. The resulting product comprised clean, dustless uniform beads.

28 Claims, No Drawings

DENSIFICATION OF PARTICULATE MATERIALS

BACKGROUND OF THE INVENTION

The dusting of powders has been a problem since the earliest times. Industrial emphasis on the control of dust began in the early years of the coal and the flour-milling industries where the dust was not only a health hazard, from the point of view of ingestion of the dust by breathing, but an explosion and fire hazard as well. In modern plants, particularly those in which pigments are processed for the paint and plastic industries, and most particularly with respect to those pigments that exhibit high-dusting tendencies, the dust evolved is a constant source of annoyance and danger in the plant. In recent years the necessity of complying with various federal and state regulations in the pollution control area as well as others, has made the provision of suitable dust control means a matter of considerable urgency.

Particularly in the handling of certain metal oxides, such as beryllium and selenium oxides, which are highly toxic and at the same time have an intense proclivity to dust, the elimination of dusting is critical to effect safe handling. Consequently, many attempts have been made to bind the dust in some manner and to control it to some extent. For example, attempts have been made to allay dust by misting water in the air so as to maintain an excess of humidity in the area. Oils have also been used around coal dust to alleviate the problem. Such methods are inapplicable where pigments and other powders are processed by the very requirement that the pigments be dry.

Thus, where dry particulate dusting powders are routinely processed, vacuum systems are used to suck the dust-laden air out to a collection means, such as an air filter, Cottrell precipitator, or the like. In this regard, it might be worth noting that a monumental effort has been directed towards compositions suitable for coating air filters and other dust collection means to entrap dust more effectively and to permit the operation of the dust separation means over relatively long periods of time.

The instant invention is directed to a method for preventing the formation of dust during the processing of finely divided materials, such as pigments, stabilizers, blowing agents, many food substances as well as pharmaceutical materials, thus dispensing with the requirements of complicated and increasingly more sophisticated and expensive dust collection apparatus.

A large volume of prior art is directed to the collection of dust which has been spread over an area, such as sweeping compositions, which are useful for sweeping up layers of dust, and compositions which may be applied to cloths, mops, sponges, and the like, which may be contacted with surfaces on which dust is deposited, thus forcing the dust to adhere to the article impregnated with the composition. The instant invention is directed solely to the prevention of dust in bulk, finely divided and super-finely divided, particulate powders which, having been treated in accordance with the instant process, may be handled freely and spread in relatively thin layers without exhibiting dusting. Materials which exhibit high-dusting are exemplified by finely ground silica of less than 325 Tyler mesh, finely ground pigments, flour, and other materials which have a significant superfines content. Other powders in the sub-micron size which have a high tendency to dust are talc, clay, particulate electro-deposited metals and metal oxides formed in certain processes, and particularly carbon black and various forms of activated carbon.

SUMMARY OF THE INVENTION

The instant invention makes possible convenient handling of even the most high-dusting material by offering a choice of embodiments of a simple process, easily incorporated in existing processing facilities, any of which embodiments effectively suppresses or essentially negates the normally-high-dusting characteristic of the material without appreciably affecting its free-flowing nature or changing its primary particle size.

In accordance with the present invention, dust generating organic and inorganic substances and materials are treated with a composition comprising a hydrophobic-hydrophilic liquid polymeric substance and a solid, low molecular weight polymer having a melting point of from about 95° C. to about 105° C. In general, the components will be employed in the proportions of solid polymer to liquid polymeric substance of from 1 to 1 to 2 to 1. The term polymer is used generically in the specification to include both homopolymers and copolymers.

The components can be compounded according to generally known procedures and the treatment of the dust generating materials with the treatment composition carried out by several diverse embodiments, including spraying, pouring on, in situ admixture, following which or concurrent therewith, the temperature is brought to the melting point of the solid copolymeric component at which point the transformation of the dirty, bulky, dust prone material to clean, uniform, dustless beads is effected.

DETAILED DESCRIPTION OF THE INVENTION

The present invention relates both to a composition for use in the suppression or substantial elimination of dusting problems and to a method for treating dust prone organic and inorganic materials to provide dustless, free-flowing powders. In addition, the present invention results in the highly advantageous effect of providing clean, uniform particles from dirty, dusty materials of high bulk.

The surprising and significant improvements afforded by the practice of the present invention are provided by blending two specific types of additives in particular proportions and employing the resultant composition in the treatment of dirty, dusty materials. The products which result from the treatment disclosed herein are free-flowing, dustless materials of greatly reduced bulk density and are completely clean to the eye and to the touch.

The components of the composition of the present invention respectively are broadly characterized as a liquid polymeric substance and as a low molecular weight polymer having a melting point on the order of about 95° to 105° C. While the examples set forth hereinafter chiefly employ epoxidized soybean oil and a low molecular weight ethylene-vinyl acetate copolymer, other substances meeting the definition can also be suitably employed. Thus, there can be employed as the liquid polymeric substance other hydropholic-hydrophilic materials such as non-ionic long chain polyamino amides, high molecular weight fatty acid esters, salts of polyamino amides with high molecular weight acids, imidazoline derivatives, unsaturated polyester alkyd resins and plasticizers such as dipropylene glycol dibenzoate.

The solid substance polymer can be an ethylene homopolymer, a copolymer of ethylene and acrylic acid, a propylene homopolymer, copolymers of propylene and acrylic acid, oxidized polyethylenes and polypropylenes and polycaprolactone polymers.

The molecular weight of the above solid polymers will in general be within the range of from about 2,000 to about 10,000. Some deviations from this range will be acceptable depending on the particular polymer employed.

The proportions of solid homo- or copolymer to liquid polymeric substance can vary from about 1:1 to about 10:1. The proportion of additive, that is, of combined solid polymer and liquid polymeric substance, to particulate material can range from about 5% to about 40%. Preferred operating proportions, both of additive ingredients and of additive to the material being treated, will depend on the nature of the particular material undergoing treatment. Broadly, however, they may be defined as from about 1:1 to about 2:1 of solid polymer to liquid polymeric substance and from about 8% to about 25% of additive system to about 92% to about 75% of particulate material.

In carrying out the treatment, the components of the treating composition can be admixed according to generally known procedures. Thus, the solid can be melted with the liquid prior to the treatment step and the mixture added to the pigment, either at ambient temperature or with pre-warming of the pigment.

Alternatively, the components can be admixed with the material being treated and the resulting mixture brought to about the melting point of the solid. This alternative procedure can be further modified by adding the solid polymer to the powder material initially and then adding the liquid polymeric substance, preferably in incremental additions.

Irrespective of the particular procedure employed, it has been found that the material transformation of the treated material takes place in the neighborhood of the melting point of the solid polymer. The change effected is dramatic; a dirty, high bulk, dusty material changes almost at once to clean, uniform dustless particles of greatly reduced bulk density.

While the invention is hereinafter exemplified in its application to the treatment of colorants, that is, dyes, pigments and the like, as well as with blowing agents and filler materials, it has been found and comprises a part of the present invention that the treatment is fully as effective in the treatment of food stuffs, pharmaceuticals and other fine chemicals and of the numerous chemical additives and other substances provided in powder or particulate form.

EXAMPLE 1

The following ingredients in the following proportions by weight,

| | |
|---|---|
| Chrome yellow pigment | 92.0% |
| Ethylene-vinyl acetate copolymer (molecular weight 2500) | 4.0% |
| Epoxidized soybean oil | 4.0%, | were charged to a Papenmeir mixer which was run at 1500 RPM until a temperature of 95° C. was reached. The product was discharged as clean, uniform, dustless beads. This was in marked contrast to the bulky, dirty, dusty chrome yellow pigment charged to the mixer.

EXAMPLE 2

25.0% by weight of dirty, bulky, dusty phthalocyamine blue was charged to a Papenmeir mixer followed by the addition of 65.0% by weight of a low molecular weight ethylene-vinyl acetate copolymer (Microtene MU 765), 2.0% by weight of stearamide (Advowax 290), 4.0% by weight of a second low molecular weight ethylene-vinyl acetate copolymer (AC-400) and 4.0% of epoxidized soybean oil (G-62). The ingredients were admixed at 1500 RPM until a temperature of 85° C. was reached. The product discharged from the mixer was clean, dustless and grainy and of greatly reduced bulk.

EXAMPLE 3

65% by weight of Red Lake C, an organic pigment was charged to a Papenmeir mixer followed by the addition of 31 parts by weight of a low molecular weight ethylene-vinyl acetate copolymer and 4% by weight of epoxidized soybean oil. The ingredients were thoroughly mixed at 1500 RPM until a temperature of 85° C. was reached. The product discharged from the mixer was clean, dustless and grainy.

EXAMPLE 4

70% by weight of azodicarbodiamide, a blowing agent, was charged to a Papenmeir mixer together with 20% by weight of a low molecular weight ethylene-vinyl acetate copolymer and 10% by weight of epoxidized soybean oil. The ingredients were admixed for 5 minutes at 1500 RPM at which point the solid material had melted. The product discharged from the mixer was clean, dustless powder of varying particle size.

The procedure described above was modified by heating and mixing the copolymer and the epoxidized soybean oil together and then adding the mixture to the blowing agent. Similar excellent results were obtained.

EXAMPLE 5

75% by weight of carbon black was charged to a Papenmeir mixer. A melt of 17% by weight of ethylene-vinyl acetate copolymer and 8% by weight of epoxidized soybean oil was then added to the carbon black and was admixed for 5 minutes at 1500 RPM. Clean, dustless particles were obtained which gave satisfactory results on let-down.

EXAMPLE 6

75% by weight of carbon black was added to a heated Papernmeir mixer and preheated for 5 minutes at 250°.

A melt of 17% by weight of a low molecular weight polyethylene copolymer (AC 617A) and 8 parts of epoxidized soybean oil was then added to the mixer. The resulting composition was mixed for 10 minutes at 1500 RPM to yield a product of excellent quality.

EXAMPLE 7

The procedure of Example 6 was repeated except that 17% by weight of a polyethylene acrylic acid copolymer was employed in place of the polyethylene homopolymer. Similar excellent results were obtained.

EXAMPLE 8

The procedure of Example 6 was repeated except that 5 parts by weight of the polyethylene homopolymer were replaced by 5% by weight of a phosphate stabilizer, Weston 619. Similar excellent results were obtained.

EXAMPLE 9

30% by weight of a channel black was charged to a Papenmeir mixer which had been heated to 250° F. A melt of 51% by weight of a low molecular weight ethylene-vinyl acetate copolymer and 19% by weight of a long chain polyamino amide salt of a high molecular weight acid ester were added to the preheated channel black and a resulting mixture run at 1500 RPM for 10 minutes to yield a clean, dustless product of excellent quality.

EXAMPLES 10–44

These examples are prepared by charging the particulate product to a Papenmeir mixer, adding a melt of the solid polymer and the liquid polymeric substance thereto and admixing the resultant admixture for 5 minutes at 1500 RPM. In all instances, clear, dustless products were obtained.

The particular particulate materials, solid polymers, liquid polymeric substances, the ratios of solid polymer to liquid polymeric substances, concentration of particulate material in the end product and the results obtained are set forth in Table II below.

The particular materials employed are identified in Table II by the symbols indicated in the following Table I.

TABLE I
TABLE OF SYMBOLS

1. Solid Polymers
   - A  Low molecular weight ethylene/vinyl acetate copolymer
   - B  Low molecular weight polyethylene homopolymer (Softening point - 85-131° F.)
   - C  Oxidized low molecular weight polyethylene homopolymer
   - D  Polycaprolactone polymer, average molecular weight 15,000-40,000; melting point 60-70° C.

2. Liquid Polymeric Substances
   - LL  Salt of long chain polyamino-amide and high molecular weight acid ester, e.g. Antiterra U.
   - MM  Imidazoline derivative - Tertiary amine, e.g. Amine O
   - NN  Epoxidized Soybean Oil
   - OO  Unsaturated Polyester Alkyd Resin, e.g. GR-1208
   - PP  Dipropylene glycol dibenzoate, e.g. Benzoflex 988

TABLE II

| Example No. | Particulate Material | Concentration in End Product | Additive System Solid Polymer | Additive System Liquid Polymeric Substance | Ratio of Solid Polymer to Liquid Polymeric Substance | End Product Color |
|---|---|---|---|---|---|---|
| 10 | Pigment Black No. 7 | 75% | A | NN | 2:1 | Black |
| 11 | Pigment Black No. 7 | 75% | C | NN | 2:1 | Black |
| 12 | Pigment Black No. 7 | 75% | A | NN | 1.5:1 | Black |
| 13 | Pigment Black No. 7 | 30% | A | LL | 51:19 | Black |
| 14 | Pigment Blue No. 15 | 80% | A | NN | 2:1 | Blue |
| 15 | Pigment Blue No. 15 | 80% | A | NN | 1:1 | Blue |
| 16 | Red Dye | 50% | A | NN | 3:1 | Red |
| 17 | Pigment White No. 6 | 92% | A | NN | 1:1 | White |
| 18 | Pigment Blue No. 15 | 60% | A | MM | 7:1 | Blue |
| 19 | Pigment Green No. 7 | 60% | A | MM | 6.6:1 | Green |
| 20 | Dibasic Lead Phthalate | 92% | A | NN | 3:1 | Flat |
| 21 | Pigment Blue No. 15 | 50% | D | OO | 2:1 | Blue |
| 22 | Calcium Carbonate | 90% | A | NN | 2:1 | Flat |
| 23 | Pigment Red No. 101 | 51% | A | NN | 5:3 | Red Oxide |
| 24 | Pigment Black No. 7 | 75% | A | MM | 2:1 | Black |
| 25 | Pigment Black No. 7 | 65% | A | MM | 2:1 | Black |
| 26 | Barium Cadmium | 94% | A | MM | 2:1 | Flat |
| 27 | Lead Sulphate | 92% | A | MM | 3:1 | Flat |
| 28 | Dibasic Lead Stearate | 92% | A | MM | 3:1 | Flat |
| 29 | Pigment White No. 6 | 66% | A | MM | 3:1 | White |
| 30 | Pigment Red No. 213 | 89% | A | MM | 4:1 | Flrsnt. Red |
| 31 | Pigment | | | | | |

TABLE II-continued

| Example No. | Particulate Material | Concentration in End Product | Additive System Solid Polymer | Additive System Liquid Polymeric Substance | Ratio of Solid Polymer to Liquid Polymeric Substance | End Product Color |
| --- | --- | --- | --- | --- | --- | --- |
| 32 | Yellow No. 34 Pigment | 91% | A | MM | 1:1 | Yellow |
| 33 | Black No. 7 Pigment | 56% | A | PP | 5:1 | Black |
| 34 | Yellow No. 42 Pigment | 83% | A | MM | 2:1 | Yellow |
| 35 | Brown No. 11 | 86% | A | MM | 2:1 | Brown |
| 36 | Sb₂O₃ | 92% | A | MM | 1:1 | Flat |
| 37 | Pigment Yellow No. 37 Pigment | 92% | A | MM | 1:1 | Yellow |
| 38 | Red No. 106 Pigment | 92% | A | MM | 1:1 | Red |
| 39 | Red No. 101 | 92% | A | MM | 1:1 | Red Oxide |
| 40 | Zinc Stearate | 80% | A | MM | 5:3 | Flat |
| 41 | Calcium Stearate | 80% | A | MM | 5:3 | Flat |
| 42 | Pigment Red No. 46 | 70% | A | MM | 1:1 | Red |
| 43 | Pigment Yellow No. 34 | 92% | A | MM | 1:1 | Yellow |
| 44 | Azo Dicarbonomide | 85% | A | MM | 2:1 | CBA |
|  | Pigment Black No. 7 | 75% | B | MM | 2:1 | Black |

The identification of various particulate materials by pigment number, i.e. Pigment Black No. 7, is taken from the industry recognized standard "Raw Materials Index—Pigment Section", the November 1979 Edition, edited by Ellen E. Marsich, published by National Paint and Coating Association, 1500 Rhode Island Avenue, N.W., Washington, D.C.

We claim:

1. A composition comprising (a) a hydrophobic-hydrophilic liquid substance selected from the group consisting of non-ionic long chain polyamino amides, high molecular weight fatty acid esters, salts of polyamino amides with high molecular weight acids, imidazoline derivatives, unsaturated polyester alkyd resins and plasticizers and (b) a solid, low molecular weight polymer having a molecular weight of from about 2,000 to about 10,000 and a melting point of from about 95° to about 105° C., wherein (a) and (b) are present in the proportions of from about 1 to about 1 to about 1 to about 10.

2. A composition according to claim 1, wherein (a) and (b) are present in the proportions of from about 1 to about 1 to about 1 to about 2.

3. A composition comprising (a) a hydrophobic-hydrophilic liquid substance selected from the group consisting of non-ionic long chain polyamino amides, high molecular weight fatty acid esters, salts of polyamino amides with high molecular weight acids, imidazoline derivatives, unsaturated polyester alkyd resins and plasticizers and (b) a member selected from the group consisting of an ethylene homopolymer, a copolymer of ethylene and acrylic acid, ethylene-vinyl acetate copolymer, a propylene homopolymer, copolymers of propylene and acrylic acid, oxidized polyethylenes and polypropylenes and polycaprolactone polymers, wherein (a) and (b) are present in the proportions of from about 1 to about 1 to about 1 to about 10.

4. A composition according to claim 3 wherein (b) is a low molecular weight ethylene-vinyl acetate copolymer.

5. A composition according to claim 3 wherein (a) is a non-ionic long chain polyaminoamide.

6. A composition according to claim 3 wherein (b) is a low molecular weight ethylene homopolymer.

7. A composition according to claim 3 including (c) a particulate material.

8. A composition according to claim 7 wherein the particulate material is inorganic.

9. A composition according to claim 7 wherein the particulate material is organic.

10. A composition according to claim 7 wherein the particulate material is a pigment.

11. A composition according to claim 7 wherein the particulate material is a chemical blowing agent.

12. A composition according to claim 7 wherein the particulate material is a lubricant.

13. A composition according to claim 7 wherein the particulate material is a filler.

14. A composition according to claim 7 wherein the particulate material is a stabilizer.

15. A method for the densification of organic and inorganic dust which comprises treating the dust particles with a composition comprising (a) a hydrophobic-hydrophilic liquid substance selected from the group consisting of non-ionic long chain polyamino amides, high molecular weight fatty acid esters, salts of polyamino amides with high molecular weight acids, imidazoline derivatives, unsaturated polyester alkyd resins and plasticizers and (b) a solid, low molecular weight polymer, wherein (a) and (b) are present in the proportions of from about 1 to about 1 to about 1 to about 10, at about the temperature at which component (b) becomes molten.

16. A method according to claim 15, wherein (b) has a molecular weight of from about 2,000 to about 10,000 and a melting point of from about 95° to about 105° C.

17. A method according to claim 15, wherein (b) is a member selected from the group consisting of an ethylene homopolymer, a copolymer of ethylene and acrylic acid, ethylene-vinyl acetate copolymer a propylene homopolymer, copolymers of propylene and acrylic acid, oxidized polyethylenes and polypropylenes and polycaprolactone polymers.

18. A method according to claim 15, wherein (a) is epoxidized soybean oil.

19. A method according to claim 15, wherein (b) is a low molecular weight ethylene-vinyl acetate copolymer.

20. A method according to claim 15, wherein (a) is a non-ionic long chain polyaminoamide.

21. A method according to claim 15, wherein (b) is a low molecular weight ethylene homopolymer.

22. A method according to claim 15, wherein the relative proportions of dust particles to composition are from about 95% to about 60% to about 5% to about 40%.

23. A method according to claim 15, wherein the relative proportions of dust particles to composition are from about 92% to about 75% to about 8% to about 25%.

24. A method according to claim 15 wherein the particles treated are pigment particles.

25. A method according to claim 15 wherein the particles treated are chemical blowing agent particles.

26. A method according to claim 15 wherein the particles treated are lubricant particles.

27. A method according to claim 15 wherein the particles treated are filler particles.

28. A method according to claim 15 wherein the particles treated are stabilizer particles.

* * * * *